(12) United States Patent
Abali et al.

(10) Patent No.: US 10,884,949 B2
(45) Date of Patent: Jan. 5, 2021

(54) ON-CHIP LOGIC ACCELERATOR

(71) Applicant: International Business Machines Corporation, Armonk, NY (US)

(72) Inventors: Bulent Abali, Tenafly, NJ (US); Sameh Asaad, Briarcliff Manor, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/375,956

(22) Filed: Apr. 5, 2019

(65) Prior Publication Data

US 2020/0320018 A1 Oct. 8, 2020

(51) Int. Cl.
*G06F 12/12* (2016.01)
*G06F 12/122* (2016.01)
*G06F 12/0811* (2016.01)

(52) U.S. Cl.
CPC ........ *G06F 12/122* (2013.01); *G06F 12/0811* (2013.01); *G06F 2212/1021* (2013.01); *G06F 2212/608* (2013.01)

(58) Field of Classification Search
CPC .............. G06F 12/0811; G06F 12/122; G06F 2212/608; G06F 2212/1021
USPC ........................................................ 711/133
See application file for complete search history.

(56) References Cited

U.S. PATENT DOCUMENTS

| | | | |
|---|---|---|---|
| 5,986,467 A | 11/1999 | Trimberger | |
| 7,382,154 B2 | 6/2008 | Ramos et al. | |
| 7,406,573 B2 | 7/2008 | Huppenthal et al. | |
| 7,577,553 B2 | 8/2009 | Bennett, III et al. | |
| 7,650,545 B1 | 1/2010 | Abramovici et al. | |
| 8,185,696 B2 | 5/2012 | Vuletic et al. | |
| 8,229,918 B2 | 7/2012 | Branscome et al. | |
| 8,473,715 B2 | 6/2013 | Stillwell, Jr. et al. | |
| 9,099,195 B2 | 8/2015 | Zhang et al. | |
| 2006/0107027 A1 | 5/2006 | Chen et al. | |
| 2015/0242308 A1 | 8/2015 | Kim et al. | |
| 2017/0153854 A1* | 6/2017 | Zheng | G06F 3/0613 |
| 2019/0034363 A1* | 1/2019 | Palermo | G06F 9/3877 |

OTHER PUBLICATIONS

Miljan Vuletic et al., "Multithreaded Virtual-Memory-Enabled Reconfigurable Hardware Accelerators", FPT 2006/copyright 2006 IEEE, pp. 197-204.

(Continued)

*Primary Examiner* — Hua J Song
(74) *Attorney, Agent, or Firm* — Cantor Colburn LLP; Kevin Michael Jordan (57) ABSTRACT

Embodiments of the invention are directed to a computer-implemented method of memory acceleration. The computer-implemented method includes mapping, by a processor, an array of logic blocks in system memory to an array of logic blocks stored in level 1 (L1) on an accelerator chip, wherein each logic block stores a respective look up table for a function, wherein each function row of a respective look up table stores an output function value and a combination of inputs to the function. The processor determines that a number of instances of request for the output function value from a logic block is less than a first threshold. The processor evicts the function row to a higher level memory.

9 Claims, 5 Drawing Sheets

(56) References Cited

OTHER PUBLICATIONS

Nahla A. El-Araby et al., "Dynamic Reconfiguration for Increased Functional Density", The 6th International Workshop on System on Chip for Real Time Applications, © 2006 IEEE, pp. 33-36.
Sek M. Chai et al., "Reconfigurable Streaming Architectures for Embedded Smart Cameras", Proceedings of the 2006 Conference on Computer Vision and Pattern Recognition Workshop (CVPRW'06), © 2006 IEEE The Computer Society, 8 pps.
Y. Shibata et al., "A Virtual Hardware System on a Dynamically Reconfigurable Logic Device", Field-Programmable Custom Computing Machines, 2000 IEEE Symposium on Year: 2000, pp. 295-296.

* cited by examiner

ON-CHIP LOGIC ACCELERATOR

BACKGROUND

The present invention generally relates to a logic accelerator, and more specifically, to an on-chip logic accelerator that stores infrequently used logic off-chip.

A hardware accelerator is a device that typically connected to the CPU, for example, an input/output adapter that enhances the overall performance of a computing device. Hardware acceleration is controlled by software on a host machine that requests extra computing resources or power to assist with heavy computing tasks or operations. Hardware accelerators are sometimes referred to as a "co-processors" and typically perform dedicated computing functions including, but not limited to, CPU processes, cryptographic operations and calculations, encoding/decoding processes, and network operations.

SUMMARY

Embodiments of the present invention are directed to a computer-implemented method for memory acceleration. A non-limiting example of the computer-implemented method includes mapping, by a processor, an array of logic blocks in system memory to an array of logic blocks stored in level 1 (L1) on an accelerator chip, wherein each logic block stores a respective look up table for a function, wherein each function row of a respective look up table stores an output function value and a combination of inputs to the function. The processor determines that a number of instances of requests for the output function value from a logic block is less than a first threshold. The processor evicts the function row to a higher level memory.

Embodiments of the present invention are also directed to a system and a computer program product for a logic accelerator having substantially the same features as the computer-implemented method described above.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning to an overview of technologies that are more specifically relevant to aspects of the invention, a lookup table (LUT) is a data structure made of held predetermined values that respectively correspond to various input combinations. These values are either calculated during the creation of an application or after an application is launched. LUTs conserve processing power by enabling systems to fetch these values rather than repeatedly performing the same computations on the same set of inputs.

Generally, conventional LUTs are made of a block of random access memory (RAM) made of static random-access memory (SRAM) bits connected to a cascaded sequence of multiplexers. The SRAM bits are sometimes referred to as a LUT mask. Input signals are directed to multiplexer select lines, which in turn cause the multiplexers to output the preset values. To accommodate k inputs, a typical LUT uses $2^k$ SRAM bits. The LUTs utilize multiple configurations of multiplexers and SRAM bits to mimic logic gate combinations that could be used to calculate the held output values.

An integrated circuit is configured to either perform a set of computation to calculate an output value or use a set of LUTs to retrieve an output value. A k input LUT uses $2^k$ SRAM bits to store held values. For the LUT, k binary inputs are typically arranged into $2^k$ distinct sequences combinations that each hold an output value. For example, a 6 input LUT holds 64 different input combinations with 64 output values that can be described as F(0)–F(63). As an illustration, a first six input combination can be, for example, (0 0 1 1 1 0) and a second input combination can be (0 0 1 1 1 1).

An LUT can hold the output values and each respective combination of inputs for a function. By using the LUT, a system can obviate the need to calculate an output function value each time an input combination is presented. For example, for a six-input function, an LUT can store sixty-four input combinations and sixty four output function values that do not need to be continuously recalculated. In some embodiments, the inputs are state variable retrieved from an external source. In other embodiments, the inputs are outputs of other functions. In practice, applications call output values of a function for only a limited number of input combinations. Many output function values are never or infrequently called for by the application. However, a conventional LUTs still hold these infrequently called for output function values and their input combinations. Furthermore, searching for output function values is less efficient due to the amount of data to be searched. The time spent searching also leads to latency issues as an output of one function is an input of another function. Finally, the on-chip space could be reallocated to accommodate other chip functionality.

Turning now to an overview of the aspects of the invention, one or more embodiments of the invention address the above-described shortcomings of the prior art by providing an accelerator that includes reconfigurable LUTs. The accelerator monitors the LUTs to determine the frequency that an application calls for an output function value. Based on this frequency, the accelerator can evict infrequently used output function values and their respective input combination off-chip to higher levels of cache or system memory. The accelerator can also load more frequently used output function values and their respective input combinations on-chip.

This on-chip accelerator includes a two-dimensional array of reconfigurable logic blocks, input/output blocks, and interconnects. Each logic block includes at least one LUT for a respective function. Unlike conventional systems and methods, idle logic blocks are evicted and stored off chip. As used herein, the term "chip" refers to an integrated circuit. As a result, the chip consumes less power, improves the cache miss ratio, and improves the signal velocity for the most frequently used input combinations.

Figure 1:
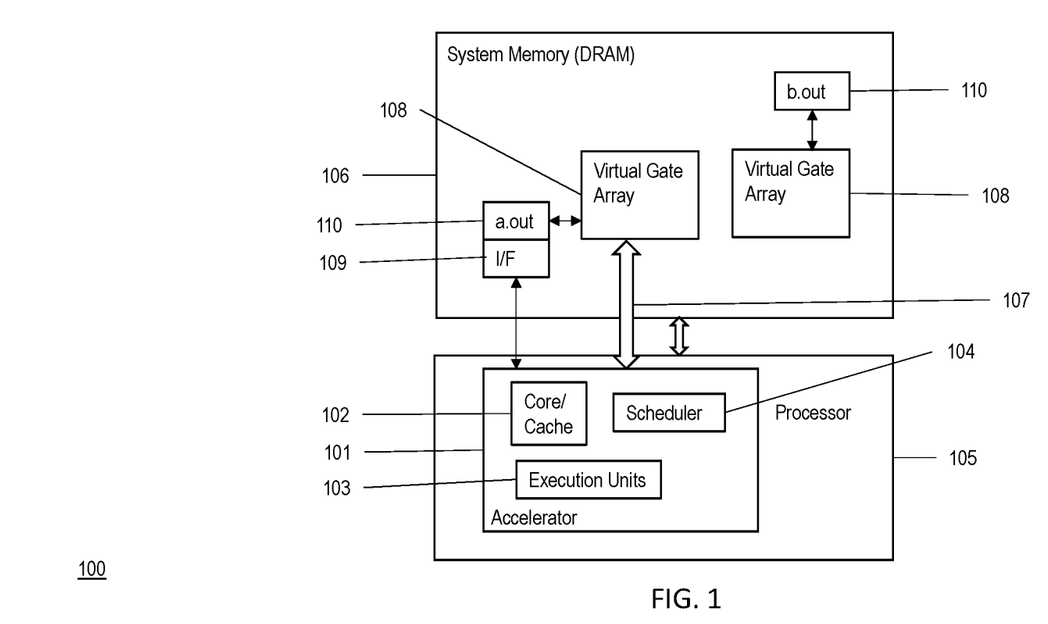
FIG. 1 depicts a block diagram of an integrated circuit logic accelerator and system memory according to one or more embodiments of the present invention.

Turning now to a more detailed description of aspects of the present invention, FIG. 1 depicts an embodiment of an on-chip accelerator system 100 in accordance with aspects of the invention. The accelerator chip 101 includes cache memory 102, execution units 103, and a scheduler 104. Each of which is in operable communication with a processor 105. The accelerator chip 101 includes configurable logic blocks, input/output block, and interconnects.

Each logic block (not shown) is identified by a block tag (BTAG), which is metadata that identifies the logic block. In some embodiments, the BTAG describes the physical location of the block on the accelerator. For example, the BTAG stores the x, y coordinate position of the block in the cache 102. Each logic block is organized as an array of function rows. Each function includes a unique combination of inputs and output function value. For example, a six input logic block would include sixty four input combinations and sixty four output function values. The input combinations can be known as a data tag or DTAG. By using the BTAG in conjunction with a DTAG, function rows are efficiently identified and retrieved from the logic block.

The on-chip logic accelerator 101 is configured to evict infrequently used or idle logic blocks from the on-chip cache 102 to a higher level memory. The higher level memory is to be understood as having a higher capacity and density and therefore cheaper than the lower level of memories. The logic accelerator 101 only stores the function rows and logic blocks that have actively switching bits. In some embodiments, the cache 102 is further subdivided into a level 1 cache (L1)/accelerator core and victim cache (not shown). A victim cache allocates only lines written back from a higher level cache. There are no allocations on fill data as part of a read miss. In some embodiments, the victim cache is fully associative. The L1 cache provides smaller and faster memory storage than the other storage locations. The execution units 103 contain logic gates and shift registers to perform the mathematical computation. The scheduler 104 or dispatcher controls a list of instructions to be executed, allocates computer resources, and coordinates fetching and evictions from the logic accelerator 101 to different memory locations. The logic accelerator 101 communicates with system memory, for example through direct memory access (DMA) 107 or any other appropriate communication method. The logic accelerator 101 uses the DMA 107 to communicate with system memory 106 independently of the processor 105. The system memory 106 contains one or more virtual gate arrays 108, an interface 109 for interfacing with the logic accelerator 101, and output channels 110 for connecting to external resources. The virtual gate arrays 108 contains data describing the configuration of the accelerator core/L1 cache 102, including the configurations of the logic blocks, input/output blocks, and any interconnects.

The processor 105 determines which data is evicted and which data is written by evaluating each function's output value. In some embodiments, the processor can monitor a function's output function value. If the output values do not change, then there is an indication that the input combinations are not switching and the logic block for that function is idle. If the function output values are changing, that is an indication that the configuration bits are switching and the logic block for that function is not idle. Logic blocks with the most actively switching bits are stored on the accelerator core/L1 cache 102. Logic blocks that have infrequent or idle switching combinations are stored off of the logic accelerator 101. In some embodiment of the present invention, logic blocks will only contain function rows for actively switching input combinations. Idle logic blocks are stored in higher level memory based upon the frequency of switching. For example, the function rows and logic blocks that exhibit the lowest amount of switching are stored in system memory 106.

In some embodiments, individual functions rows are evicted to higher levels of memory 106. In these instances, the function rows that store the function output values at a frequency greater than a first threshold are loaded to the L1 cache on the logic accelerator 101. The function rows that store the function output values at a frequency less than a first threshold are evicted from the L1 cache on the logic accelerator 101.

The system memory 106 includes multiple virtual gate arrays 108 to accommodate multiple users. Each virtual gate array 108 contains data describing the configuration of the accelerator core/L1 cache 102, including the configurations of the logic blocks, input/output blocks, and any interconnects specific to a user's applications. As a user engages the logic accelerator 101, the processor 105 causes user specific data to be written into the logic blocks of the accelerator core/L1 cache 102. The logic accelerator 101 is configured to include a locking function to restrict a second user from accessing it until after an application run by a first user has ended. The logic accelerator 101 is configured to permit multiple users to access its accelerator core/L1 cache 1-2 simultaneously. In this instance, the logic accelerator stores in each user's logic accelerator's configuration in additional memory. As a user accesses a virtual gate array 108, a signal identifying the user is transmitted to the processor 105. The processor 105 causes the user's data to be retrieved from memory and written onto the logic accelerator 103.

The processor 105 monitors logic blocks to determine whether the output function values are changing. If the input combination remains constant, the logic block does not need to be reevaluated and either remain off the logic accelerator 101. If, however, the input combinations have changed, a configuration bit is written into a table. The bit is mapped a logic block in the system memory. The block is known as a pending block. The scheduler 104 calls all the output functions of all pending blocks to the execution units 103 prior to moving to the next clock cycle. A bit is written into the memory address of each mapped block to provide the scheduler 104 with a reference value to indicate that the block is to be fetched. In some embodiments, to assist the scheduler 104, the SRAM bits are indexed by Morton indexing.

Figure 2:
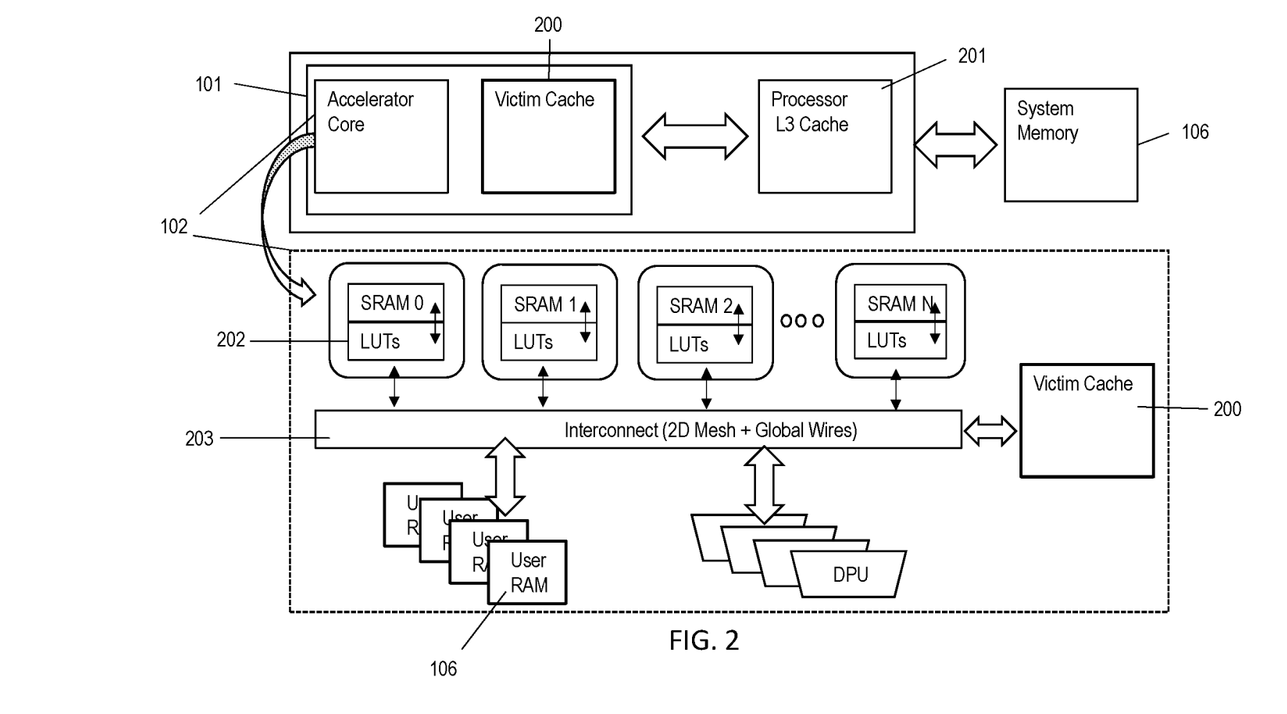
FIG. 2 depicts a block diagram of an integrated circuit logic accelerator and system memory according to one or more embodiments of the present invention.

Referring to FIG. 2, a depiction of an embodiment of the logic accelerator 101 is provided. The logic accelerator 101 includes an accelerator core/L1 cache 102 and victim cache 200. In some embodiments, the logic accelerator 101 includes a level 3 cache 201 and additional memory storage units (not shown). In terms of memory storage, the level 3 cache is larger and slower than both the accelerator core/L1 cache 102 and the victim cache 200, but smaller and faster than system memory 106. In some embodiments of the present invention, the accelerator core 102 includes 16 k LUTs per mm$^2$ of silicon area, the victim cache 200 includes 172 k LUTs per mm$^2$ of silicon area, and the level 3 cache 201 includes 2M LUTs per mm$^2$ of silicon area. The output function values are stored in static random access memory (SRAM) at each logic block 202.

FIG. 2 also provides a depiction of the accelerator core 102. The accelerator core 102 includes a two-dimensional array of logic blocks 202, reconfigurable input/output blocks (not shown), and interconnects 203. A processor (not shown) fetches an output function value by propagating a signal through the interconnects 203 to the logic blocks 202. The interconnects 203 traverse the accelerator core 102 horizontally and vertically. The interconnects 203 accesses each logic block 202 located along a respective x- or y-direction. The interconnects 103 are reconfigurable such that an access between an interconnect 203 can be severed or connected based upon an application. In some embodiments, the interconnects 203 are segmented to only connect to desired logic blocks 202. The interconnects 406 are comprised of a two-dimensional mesh of global wires. The interconnects 406 provide a medium for signals to be received and transmitted between the logic blocks and central processing unit (CPU). The interconnects are mediums used to transmit instructions to read and write function rows or entire logic blocks between the accelerator core 102, the victim cache 200, and system memory or user RAM 106.

Figure 3:
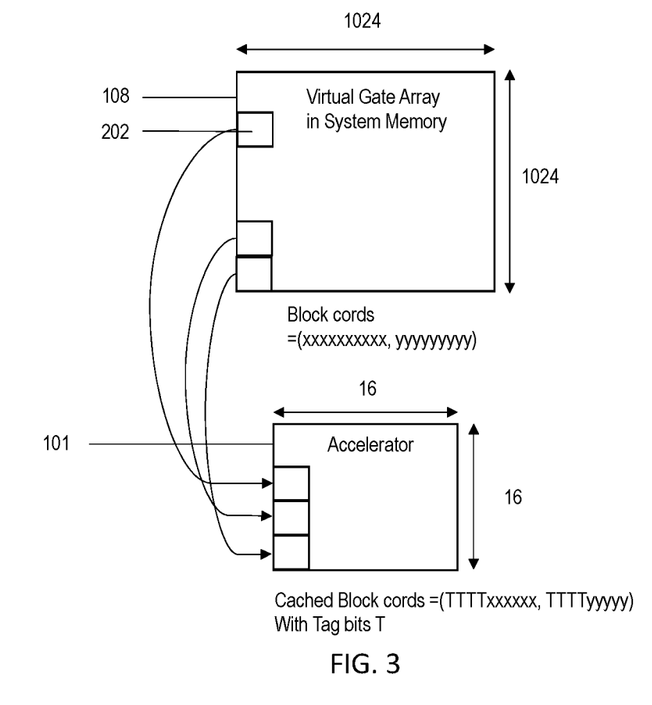
FIG. 3 depicts a block diagram of an integrated circuit logic accelerator and a virtual gate array in system memory according to one or more embodiments of the present invention.

The BTAGs and DTAGs contain metadata describing the physical location of the blocks mapped to the physical accelerator. Referring to FIG. 3, a memory address provides a physical location for each block in the logic accelerator 101. The logic blocks in the virtual gate array 108 store the logic blocks 202 that are holding the least active input combinations for a function. The logic accelerator 101, which includes an accelerator core and a victim cache (not shown), holds logic blocks 202 that have the most switching input combinations. Each logic block 300 in the virtual gate array 108 and the logic accelerator 101 is assigned a block tag for x, y mapping of logic block placement between the accelerator and the virtual gate array. In some embodiments, the most significant bits (MSB) of each memory address are used as block or data tag bits for matching when a processor is fetching data. To map the placement of the logic blocks to the placement of blocks in the virtual gate array 108, an automated place and route tool can be employed to generate a layout of the logic accelerator 101. This generated layout can be followed during the logic synthesis and place and route process and later to map the location of each logic block in the accelerator to the virtual gate array.

A processor (not shown) continuously monitors the frequency of switching between input combinations for each function at each logic block 202. For example, the processor monitors input combinations in each logic block 202 prior to each clock cycle or every m number of clock cycles. The number of instances of switching to initiate a load or an eviction can be based on threshold amounts. For example, if the input combinations switch less frequently than a first threshold amount, the logic block 202 can be evicted from LI cache. Conversely, if a request for output function values of input combination is switching greater than the first threshold amount, the logic block 202 can be loaded to the L1 cache.

The virtual gate array 108 can be further subdivided into sets of logic blocks and mapped to blocks on the on-chip logic accelerator 101. A processor fetches logic blocks 202 from the virtual gate array 108 based upon a frequency of switching input combinations. Idle blocks that are located on the on-chip logic accelerator 101 are evicted to the virtual gate array in system memory 108. The virtual gate array 108 contains more memory storage units than the logic accelerator 101. As such a very large gate array 108 can be realized with a much smaller silicon area in the logic architecture 101.

Figure 4:
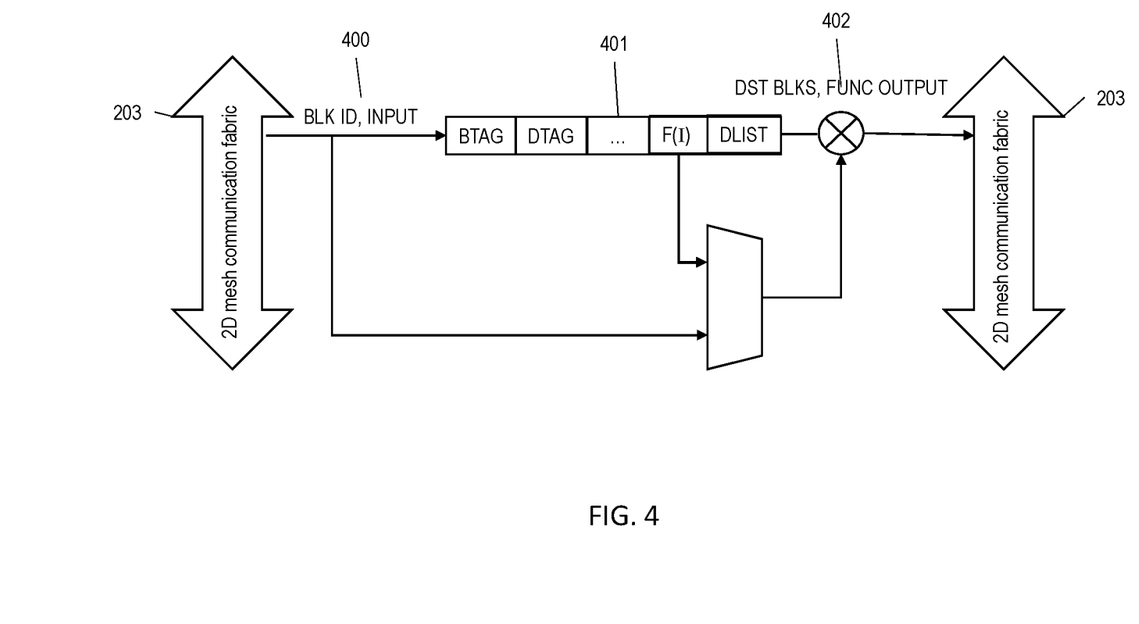
FIG. 4 depicts a block diagram illustrating the retrieval of a function output value according to one or more embodiments of the present invention.

Referring to FIG. 4, a diagram illustrating a process for fetching an output function value is shown. A processor (not shown) sends a demand 400 containing an input combination and a block tag through a two-dimensional communication network 203 of the logic accelerator. If the demand hits a logic block that contains a LUT with a matching input combination 401, the output function value 402 is transmitted back through the two-dimensional communication network 203. If the input combination is not located in the accelerator core, the processor issues a demand from the victim cache. In the event that a miss occurs and the input combination is not located in the victim cache, the processor issues a demand from system memory.

Figure 5:
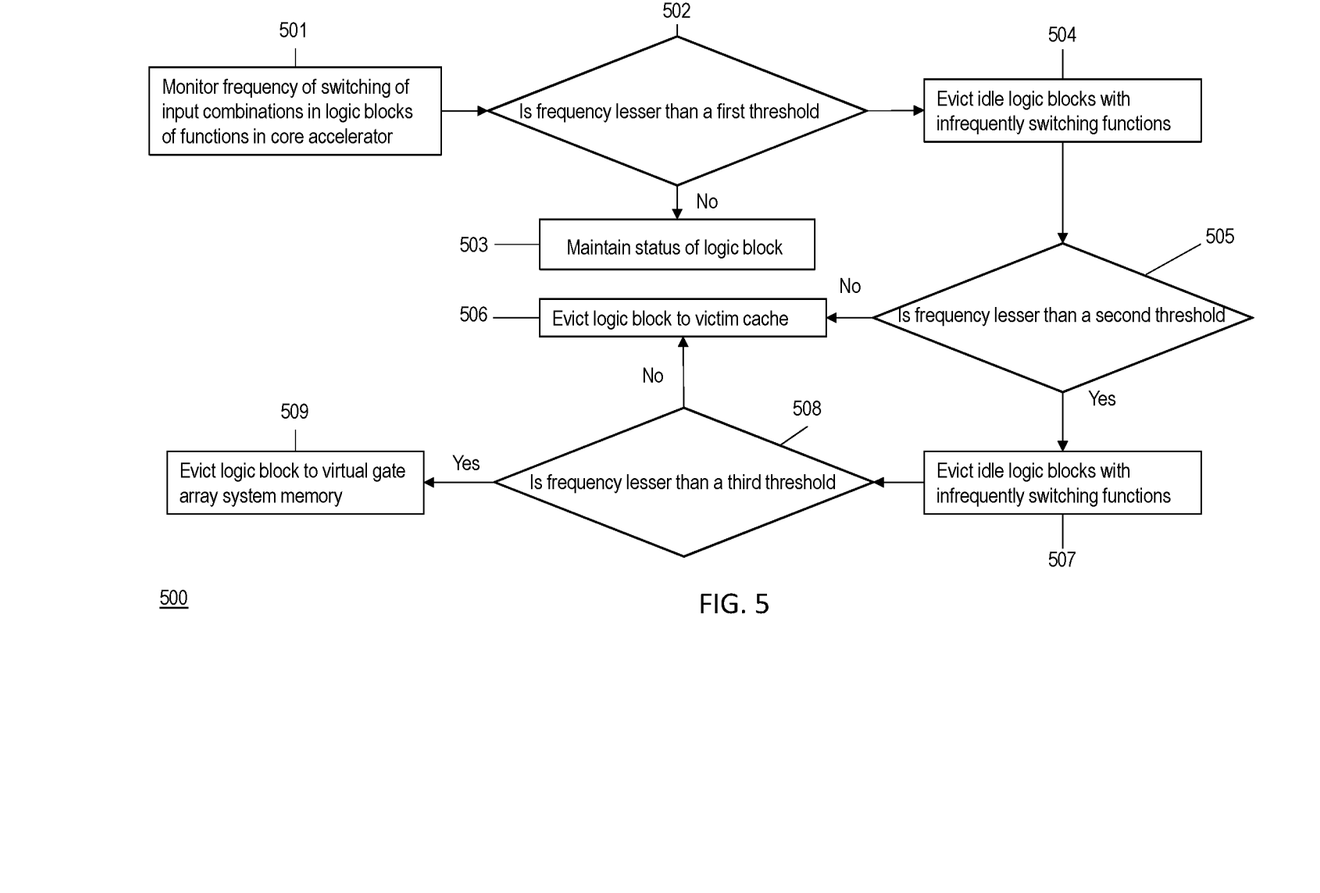
FIG. 5 depicts a flow diagram of a method for reconfiguring a logic architecture according to one or more embodiments of the present invention.

FIG. 5 depicts a flow diagram of a method for reconfiguring logic blocks according to one or more embodiments of the invention. The method 500 includes a processor monitoring the frequency of receiving requests for different input combinations in a logic block in the core accelerator at block 501. In some embodiments, the processor will determine the number of switches once each ten clock cycles. The processor determines for each logic block whether the number of switches is below a first threshold amount at block 502. If the number of switches is greater than a first threshold, the logic block can stay in the core accelerator at block 503. If the frequency of switching of input combinations at the logic block is less than a first threshold, the processor evicts the logic at block 504. The processor then determines whether the frequency of input combination switching is less than a second threshold at block 505. If the frequency of the input combination switching at the block is greater than a second threshold, the logic block is evicted to victim cache at block 506. If the frequency of the input combination switching at the block is less than a second threshold, the logic block is evicted to a higher level memory at block 507. In some embodiments of the present invention, the logic accelerator will include a level 3 cache and the logic block is evicted to this level 3 cache. The processor determines if the frequency is less than a third threshold at block 508. If the frequency of the input combination switching at the block is greater than a second threshold, the logic block is evicted to victim cache at block 506. If the frequency of the input combination switching at the block is less than a second threshold, the logic block is evicted to virtual gate array at block 509. Conversably the processor can load a logic block to lower levels of memory based on a frequency of input combinations at the logic block. For example, a logic block, in which the requested output function values for input combinations is switching at a rate greater than a first threshold, that logic block can be loaded to the core accelerator.

Although the flowchart describes writing or evicting function rows, an entire LUT or logic block is written or evicted based upon the relative frequency of the retrieval of output values. Additionally, although the flow chart shows that input function rows are evicted prior to determining which function rows are written into the accelerator core, these operations occur in an opposite order or simultaneously.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logic function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for memory acceleration, the method comprising:
   mapping, by a processor, an array of logic blocks in system memory to an array of logic blocks stored in level 1 (L1) on an accelerator chip, wherein each logic block stores a respective look up table for a function, wherein each function row of a respective look up table stores an output function value and a combination of inputs to the function;
   determining, by the processor, that a number of instances of request for the output function value from a logic block is less than a first threshold and greater than a second threshold, wherein the second threshold is less than the first threshold; and
   evicting, by the processor, the function row to victim cache.

2. The computer-implemented method of claim 1, wherein the accelerator chip is distinct from the system memory.

3. The computer-implemented method of claim 1, wherein the entire logic block holding the function row is evicted to victim cache.

4. A system for memory acceleration, the system comprising:
   a processor communicatively coupled to a memory, the processor configured to:
   map an array of logic blocks in system memory to an array of logic blocks stored in level 1 (L1) on an accelerator chip, wherein each logic block stores a respective look up table for a function, wherein each function row of a respective look up table stores an output function value and a combination of inputs to the function herein each look up table stores output functions values that are based on combinations of inputs to the function;
   determine that a number of instances of request for the output functions value from a logic block is less than a first threshold and greater than a second threshold, wherein the second threshold is less than the first threshold; and
   evict the function row to victim cache.

5. The system of claim 4, wherein the accelerator chip is distinct from the system memory.

6. The system of claim 4, wherein the entire logic block holding the function row is evicted to victim cache.

7. A computer program product for memory acceleration, the computer product comprising a computer readable storage medium having program instructions embodied therewith, the instructions executable by a processor to cause the processor to:

map an array of logic blocks in system memory to an array of logic blocks stored in level 1 (L1) on an accelerator chip, wherein each logic block stores a respective look up table for a function, wherein each function row of a respective look up table stores an output function value and a combination of inputs to the function;

determine that a number of instances of request for the output function value from a logic block is less than a first threshold and greater than a second threshold, wherein the second threshold is less than the first threshold; and evict the function row to victim cache.

8. The computer program product of claim 7, wherein the accelerator chip is distinct from the system memory.

9. The computer program product of claim 7, wherein the entire logic block holding the function row is evicted to victim cache.

\* \* \* \* \*